United States Patent
Hirose et al.

(10) Patent No.: US 8,616,534 B2
(45) Date of Patent: Dec. 31, 2013

(54) DIFFUSER TUBE

(75) Inventors: Youichirou Hirose, Amagasaki (JP); Yasunobu Okajima, Amagasaki (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/442,677

(22) Filed: Apr. 9, 2012

(65) Prior Publication Data

US 2012/0193818 A1 Aug. 2, 2012

Related U.S. Application Data

(63) Continuation of application No. PCT/JP2010/072418, filed on Dec. 14, 2010.

(30) Foreign Application Priority Data

Dec. 17, 2009 (JP) .................................. 2009-285824

(51) Int. Cl.
*B01F 3/04* (2006.01)

(52) U.S. Cl.
USPC ..................................................... 261/122.2

(58) Field of Classification Search
USPC .......................................... 261/122.1, 122.2
See application file for complete search history.

(56) References Cited

U.S. PATENT DOCUMENTS

| | | | | |
|---|---|---|---|---|
| 1,792,286 A * | 2/1931 | Curry et al. | ................. | 261/122.2 |
| 4,954,296 A * | 9/1990 | Ott | .............. | 261/122.2 |
| 7,044,453 B2 * | 5/2006 | Tharp | ........................ | 261/122.1 |
| 7,243,912 B2 * | 7/2007 | Petit et al. | ................. | 261/122.2 |

FOREIGN PATENT DOCUMENTS

| | | | |
|---|---|---|---|
| DE | 3318412 A1 | * | 11/1984 |
| DE | 3513368 | | 11/1986 |
| DE | 3513374 | | 11/1986 |
| DE | 34 41 731 | | 5/2000 |
| EP | 0 346 109 A1 | * | 12/1989 |
| FR | 1 402 244 | | 6/1965 |
| JP | 43-022611 Y | | 9/1968 |
| JP | 60-108398 U | | 7/1985 |
| JP | 5-22098 U | | 3/1993 |
| JP | 2000-185245 | | 7/2000 |
| JP | 2009-274016 | | 11/2007 |
| JP | 2008-221158 | | 9/2008 |
| WO | 00/09245 | | 2/2000 |
| WO | WO 2009/047970 | | 4/2009 |

OTHER PUBLICATIONS

Search Report dated Nov. 6, 2012 from European Application No. 10837580.9.
Search Report dated Mar. 29, 2011 from International Application No. PCT/JP2010/072418.
Office Action dated Apr. 24, 2013 from Chinese Application No. 201080044186.0.

* cited by examiner

*Primary Examiner* — Charles Bushey
(74) *Attorney, Agent, or Firm* — Beyer Law Group LLP

(57) ABSTRACT

A diffuser tube is capable of preventing sludge from entering the tube when a diffusion operation is not performed, thereby preventing clogging of diffusion holes and inside of the tube and reducing a pressure loss during the diffusion operation. The diffuser tube is formed of an elastic tubular body, and slit cutting surfaces of a diffusion slit are slanted with respect to a radial direction of a membrane member in a slanted surface portion.

5 Claims, 9 Drawing Sheets

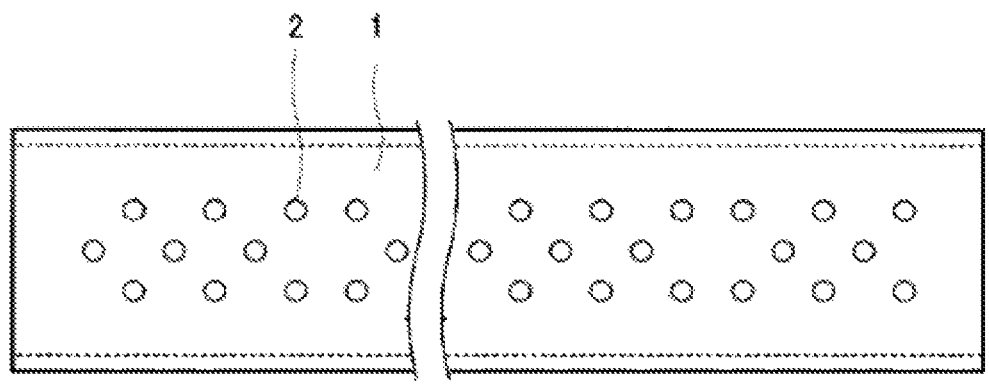
PRIOR ART  FIG. 8

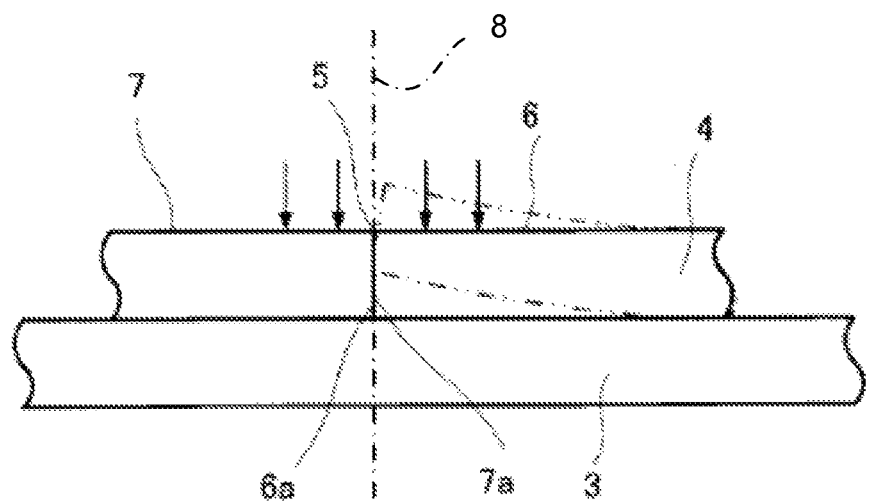
PRIOR ART  FIG. 9

DIFFUSER TUBE

CLAIM OF PRIORITY

The present application is a Continuation of International Application No. PCT/JP2010/072418 filed on Dec. 14, 2010, which claims benefit of Japanese Patent Application No. 2009-285824 filed Dec. 17, 2009. The entire contents of each application noted above are hereby incorporated by reference.

BACKGROUND OF INVENTION

1. Field of Invention

The present invention relates to a diffuser tube for diffusing gases in a processing tank used in a sewage-treatment facility and the like.

2. Description of the Related Art

FIG. 8 shows an example of a conventional diffuser device for sludge, which is formed of a vinyl chloride (PVC) tube 1 provided with a plurality of diffusion holes 2 having a diameter of about a few millimeters. The conventional diffuser device has drawbacks that, when the diffusion operation stops, the sludge comes into the interior of the tube through the diffusion holes 2 and clogs them up.

In order to prevent the ingress of the sludge, rubber membrane-type diffuser devices have been put into practical use. However, due to a higher pressure-loss during the diffusing operation, the rubber membrane-type diffusers require a higher power for blowers, resulting in an undesirable increase in power consumption.

For example, Japanese Patent No. 3353225 describes such a conventional diffuser device which is an aerator. As shown in FIG. 9, the aerator has a flat base 3 and an expandable sheet 4 disposed on the flat base 3. A number of slits 5 are formed in the sheet 4 such that a pressurized gas is supplied through the slits 5 into a liquid such that numerous bubbles are formed in the liquid. By making the shape of the slits 5 formed in the sheet 4 in a non-straight line, the sheet 4 is prevented from tearing at the slit portions, whereby the tearing problems is overcome.

SUMMARY OF THE INVENTION

In the structure described in the above-mentioned patent reference, a movable portion 9 of the sheet 4 expands to open up the slits 5, and the air is belched though the slits 5 during the diffusion operation.

However, in an initial state of the diffusion operation where the sheet 4 starts expanding, two opposing surfaces, that is, a slit cutting surface 6a of the movable portion 6 and a slit cutting surface 7a of a main body portion 7 of the slit 5 are biased from a base surface in a direction perpendicular thereto. At this time, if the opposing slit cutting surfaces 6a and 7a of the slit 5 are parallel with a direction perpendicular to a surface of the sheet 4 and the base surface, the slit cutting surface 6a on the movable portion 6 side of the sheet 4 moves with respect to the slit cutting surface 7a of the main body portion 7 in the direction of the cutting surfaces. Thus, a friction between the slit cutting surfaces 6a and 7a acts as a resistance that obstructs the opening of the slit 5, and as a result, it causes a problem of increasing the pressure loss as a result.

The embodiments of present invention solves the problems mentioned above, and objects of the present invention include providing a diffuser tube capable of preventing the sludge from entering the tube when the diffusion operation is not performed, preventing the diffusion holes and the tube from clogging, and reducing the pressure loss during the diffusion operation is reduced.

To solve the problems described above, a diffuser tube of an embodiment of the present invention includes a membrane member formed of a tubular elastic body having an inner surface which is in communication with an air supply source, and a plurality of diffusion slits formed on and penetrating through the membrane member, the diffusion slits having a non-straight line shape. Each of the plurality of diffusion slits has a slanted surface portion formed in at least a predetermined portion thereof, and cutting surfaces of the diffusion slit in the slanted surface portion are slanted with respect to a radial direction of the membrane member. The diffusion slit and a line segment formed between both ends of the diffusion slit define a closure region. In the slanted surface portion, a slit cutting surface on a closure region side of the membrane member overlays, from without, an opposing slit cutting surface on the remaining side of the membrane member.

In the diffuser tube in accordance with an embodiment of the present invention, the diffusion slits are formed in an arc shape, a chevron shape, or a bracket shape.

The diffuser tube in accordance with an embodiment of the present invention further includes a support member formed as a tubular body to hold an inner surface of the membrane member, the support member having a plurality of openings penetrating through a wall of the tubular body, the openings being provided so as not to overlap the plurality of diffusion slits.

As described above, according to embodiment of the present invention, the slit cutting surface on the closure region side of the membrane member overlays, from without, the opposing slit cutting surface on the remaining side of the membrane member in the slanted surface portion, and thus the resisting force such as a friction resistance between the closure region side and remaining membrane member side of the diffusion slit can be reduced when the diffusion slit opens up as a diffusion hole. Thus, at an onset of the diffusion operation when the air supply to the diffuser tube is started, the diffusion slits are easily open up and thus the pressure loss during the diffusion operation is reduced.

In addition, since the slit cutting surface on the closure region side of the membrane member overlays, from without, the opposing slit cutting surface on the remaining side of the membrane member in the slanted surface portion, the closure region which receives a water pressure from without is pressed onto the remaining membrane member such that the slit cutting surface on the closure region side is water-tightly in pressure-contact with the slit cutting surface of the remaining membrane member side, sludge is prevented from entering the tube, and thus clogging of the tube is also prevented when the diffusion operation is not performed.

BRIEF DESCRIPTION OF THE DRAWINGS

FIG. 6A shows the diffusion slit in an open state; and FIG. 6B shows the diffusion slit in an closed state.

FIG. 7A shows arc-shaped slits facing an outside from a center; FIG. 7B shows chevron-shaped slits pointing outwardly from a center; FIG. 7C shows bracket-shaped slits opening toward a center; and FIG. 7D shows arc-shaped slits facing a center form the outside.

FIG. 8 is a diagram showing a plan view of a conventional diffuser tube.

FIG. 9 is a diagram showing cross-sectional view of a conventional diffuser device.

DESCRIPTION OF EMBODIMENTS OF THE PRESENT INVENTION

Hereinafter, embodiments of the present invention are explained with reference to the accompanying drawings. As shown in FIGS. 1 to 4, a diffuser tube 51 has a main body formed of a membrane member 52 and a support member 53 inserted to the membrane member 52. The membrane member 52 is formed of a tubular elastic body made of EPDM (ethylene-propylene-diene rubber), polyurethane resin, silicon rubber, or the like, and the support member 53 is formed of a tubular body made of a resin or metal.

Figure 1:
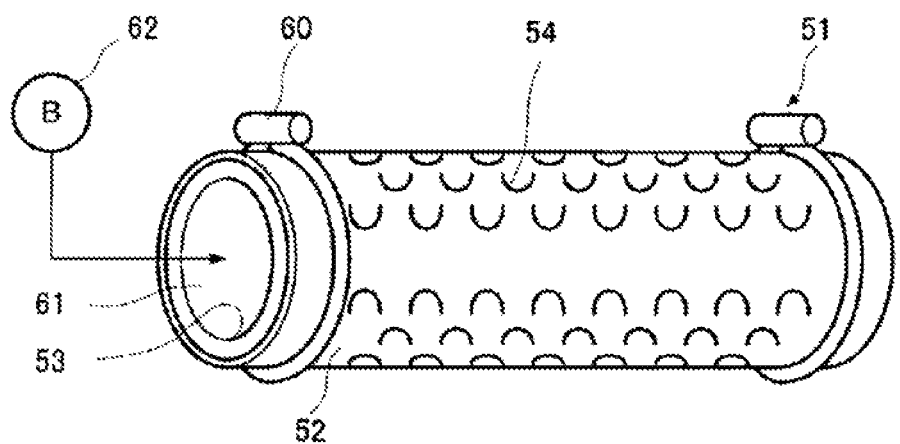
FIG. 1 is a diagram showing a perspective view of a diffuser tube in accordance with an embodiment of the present invention.
Figure 2:
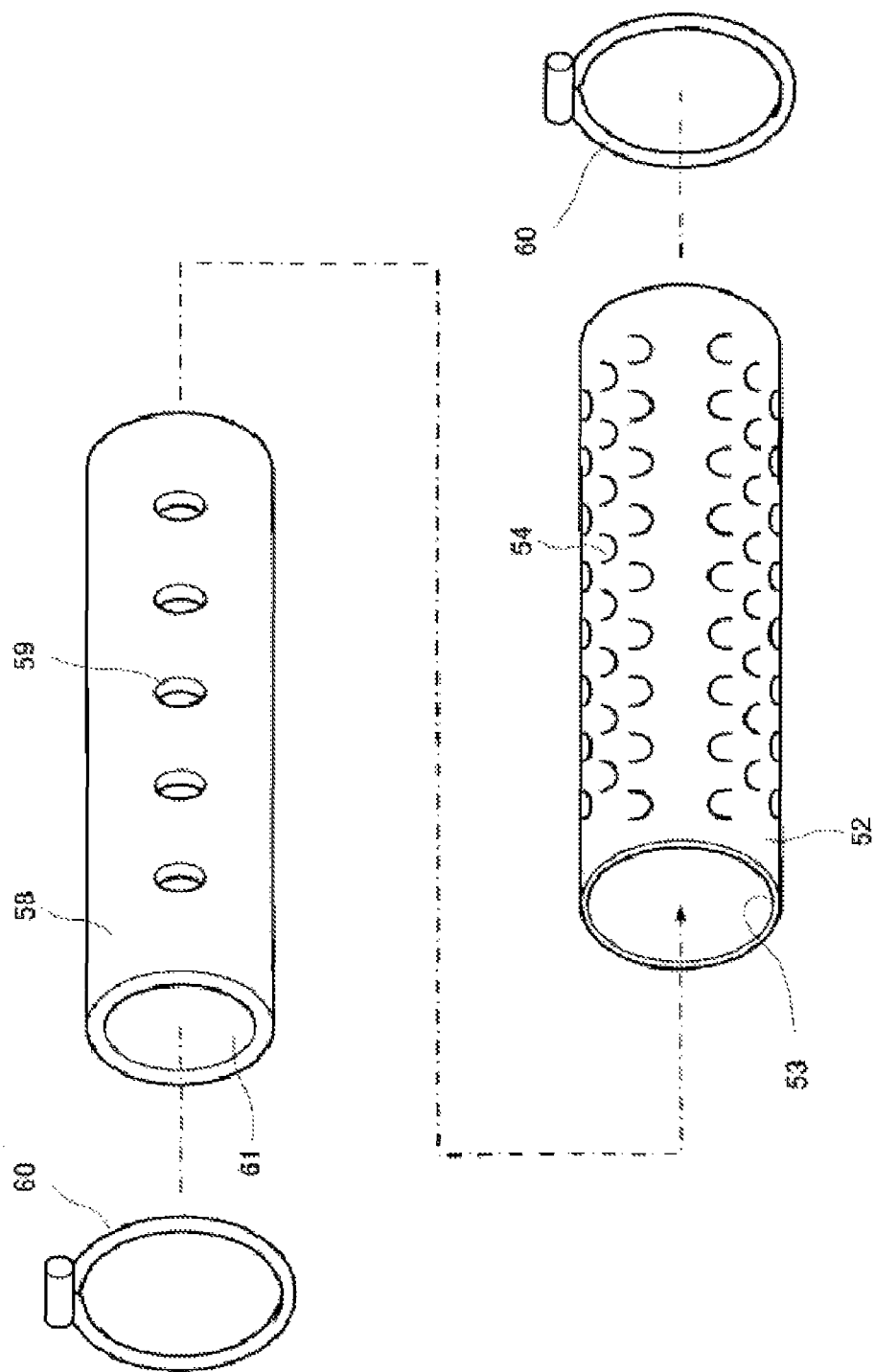
FIG. 2 is a diagram showing an exploded perspective view of the diffuser tube in accordance with the embodiment.
Figure 3:
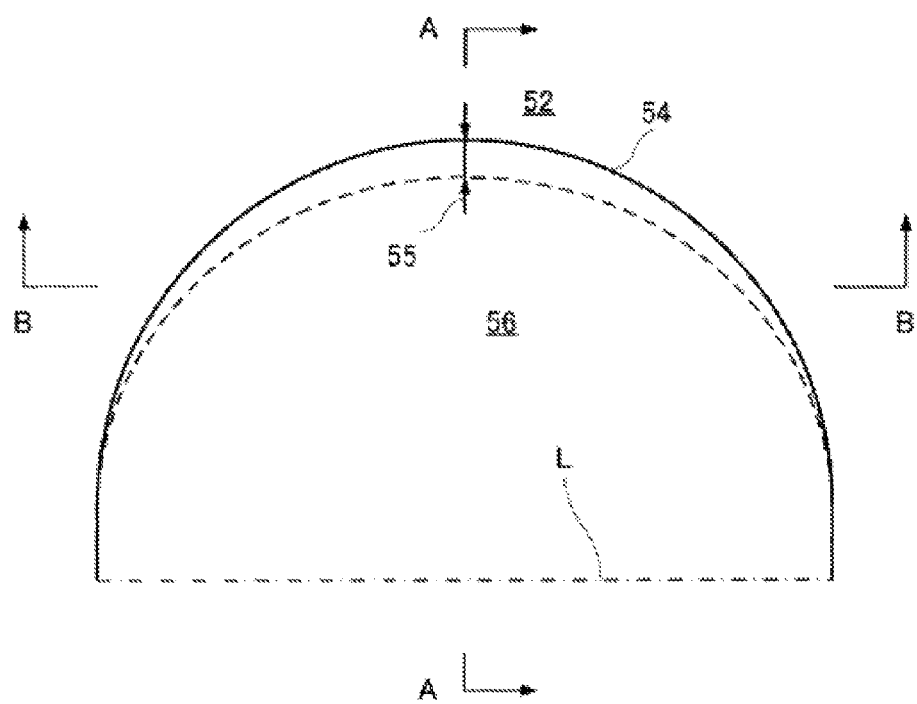
FIG. 3 is a diagram showing a schematic view of the diffusion slit in accordance with the embodiment.

A plurality of diffusion slits 54 are provided on an upper region and a lower region of the membrane member 52. The diffusion slits 54 pass through the membrane member 52 from one side to the other, and have a non-straight line shape, for example, an arc. As shown in FIG. 3, the arc of the diffusion slit 54 and a line segment L formed between both ends of the diffusion slit 54 define a closure region 56 enclosed therein.

Since the diffusion slit 54 separates the closure region 56 from the remaining membrane member 52, the closure region 56 can deform independently from the membrane member 52, not following an expansion of the membrane member 52 during the diffusion operations.

The diffusion slit 54 has a slanted surface portion 55 formed in at least a predetermined portion, for example, a predetermined region including the center portion of the arc as shown in FIG. 3. However, the slanted surface portion 55 may be provided over the entire diffusion slit 54.

Figure 4:
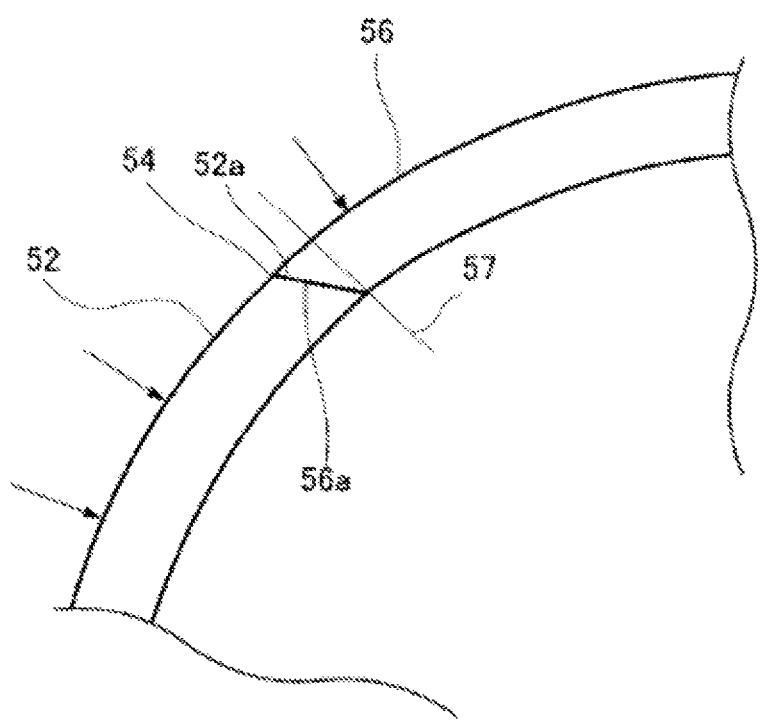
FIG. 4 is a diagram showing a cross-sectional view of the diffusion slit along line A-A in FIG. 3.
Figure 5:
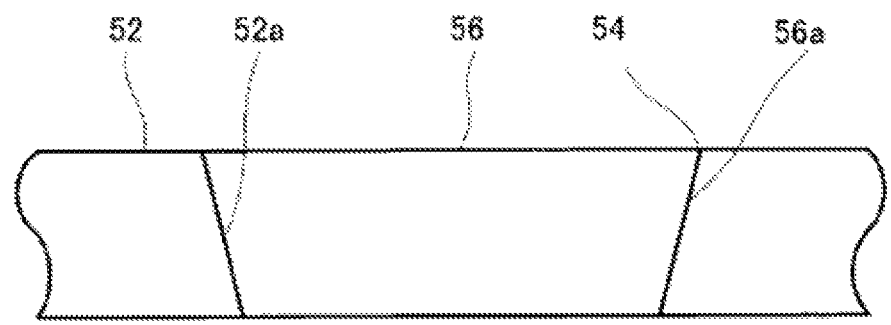
FIG. 5 is a diagram showing a cross-sectional view of the diffusion slit along line B-B in FIG. 3.

As shown in FIGS. 4 and 5, in the slanted surface portion 55, cutting surfaces of the diffusion slit 54 are slanted with respect to a radial direction 57 of the membrane member 52, such that a slit cutting surface 56a on the closure region 56 side overlays, from the outside, an opposing slit cutting surface 52a on the remaining membrane member 52 side.

As such, the closure region 56 functions as a pseudo-lid, and when the diffusion slit 54 opens up and turns into a diffusion hole, the closure region 56 is separated from the remaining membrane member 52 like a lid covering the diffusion hole is lifted therefrom, thereby reducing resisting force such as a friction resistance between the closure region 56 side and the remaining membrane member 52 side of the diffusion slit 54, which in turn reduces a pressure loss during the diffusion operations.

Figure 7A:
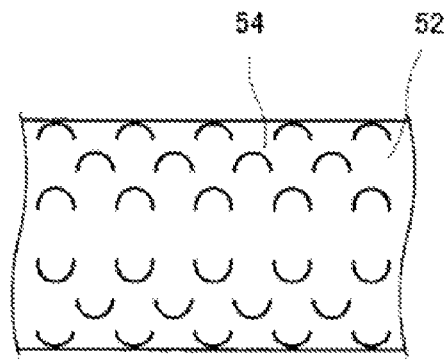
FIGS. 7A-7D are diagrams showing diffusion slit patterns of the diffusion tube viewed from above in accordance with embodiments of the present invention.
Figure 7B:
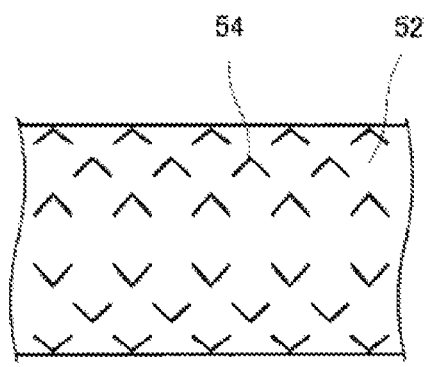
Figure 7C:
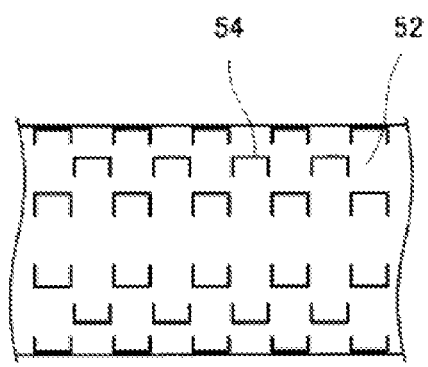
Figure 7D:
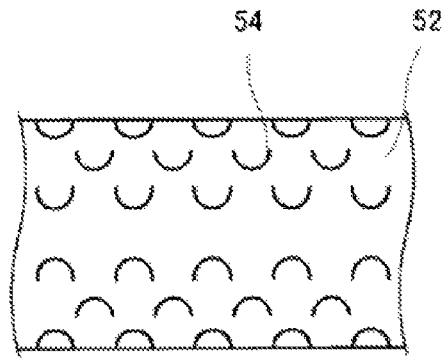

As shown in FIG. 7A, the diffusion slit 54 in accordance with this embodiment is formed in an arc shape facing outwardly from a center. However, the diffusion slit 54 can be a chevron-shaped slit pointing the outside from the center as shown in FIG. 7B, a bracket-shaped slit opening toward the center as shown in FIG. 7C, or an arc-shaped slit facing the center form the outside as shown in FIG. 7D.

The support member 53 is formed as a bottomed tubular body having a closed end (i.e., a bottom), and supports the membrane member 52 by abutting an inner surface thereof from the inside. The support member 53 has a plurality of openings (through-holes) 59 formed on a tubular wall 58 thereof. The openings 59 penetrate from one side of the tubular wall 58 to the other and are provided in a region not overlapping the diffusion slits 54, that is, side regions of the tubular wall 58.

This is because, if the openings 59 overlap the diffusion slits 54, such diffusion slits 54 would receive a greater discharge pressure from a diffusing gas and thus open up an greater extent than other diffusion slits 54. Thus, a greater amount of diffusing gas is discharged through such diffusion slits 54 overlapped with the openings 59 compared with other diffusion slits, resulting in an uneven discharge of the diffusing gas viewed from the diffuser tube as a whole. On the other hand, if the openings 59 do not overlap the diffusion slits 54, the discharge pressure from the diffusing gas is uniformly applied to the membrane member 52, realizing a uniform discharge of the diffusing gas from the entire diffuser tube.

The support member 53 and the membrane member 52 are provided with clamping members 60 at the respective ends, which air-tightly attach the support member 53 and the membrane member 52 to each other. The other (non-bottomed) end of the support member 53 is an air supply opening 61 connected to a blower 62 which is an air supply source.

Figure 6A:
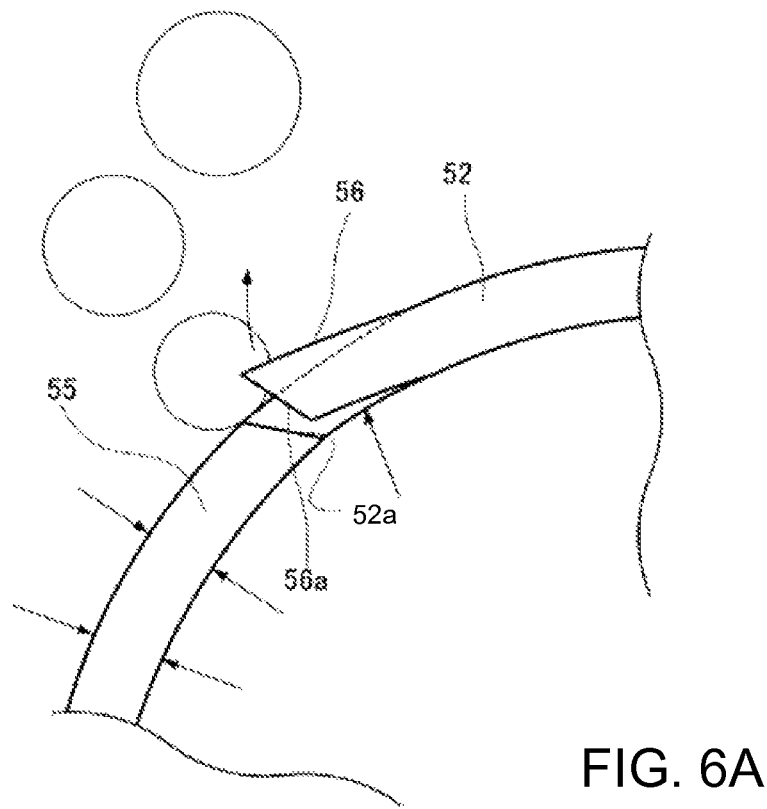
FIGS. 6A-6B are diagrams showing a diffusion slit in accordance with an embodiment of the present invention.
Figure 6B:
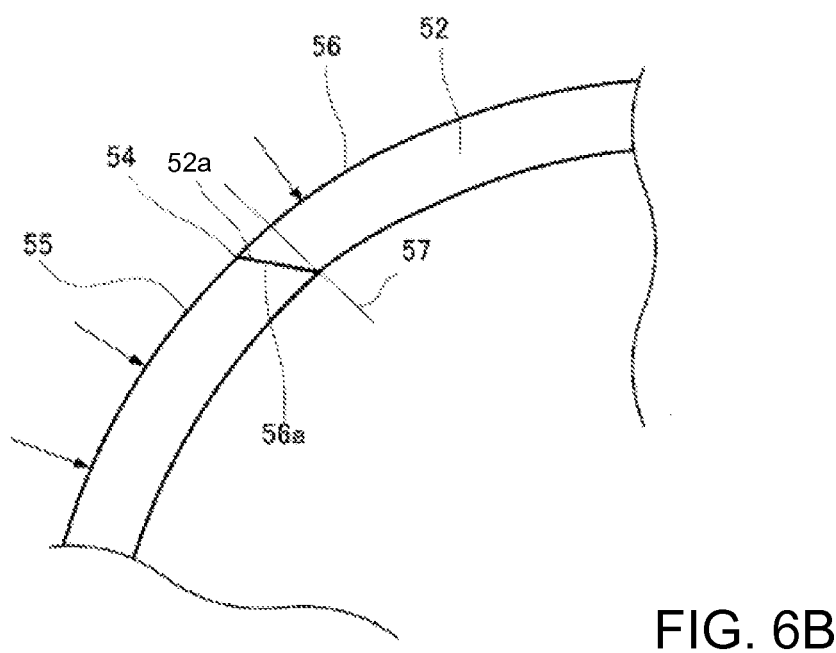

Operations of the above-mentioned structures are explained below. FIGS. 6A and 6B illustrate an operation of the diffusion slit 54, where only the membrane member 52 is shown and the support member 53 is omitted for the sake of convenience. As shown in FIG. 6B, in a state of shutdown in which the blower 62 does not supply air to the diffuser tube 51 through the air supply opening 61, in the slanted surface portion 55, the slit cutting surface 56a on the closure region 56 side overlays the slit cutting surface 52a on the remaining membrane member 52 from the outside with respect to the radial direction 57. Thus, since the closure region 56 receives a water pressure from without, the slit cutting surface 56a thereof is pressed onto the slit cutting surface 52a of the remaining membrane member 52 side such that the slit cutting surface 56a is water-tightly in pressure-contact with the slit cutting surface 52a, thereby preventing sludge from entering and clogging the tube when the diffusion operation is not performed.

As shown in FIG. 6A, when the diffusion operation is being performed, the air is supplied to the diffuser tube 51 from the blower 62 through the air supply opening 61. In this case, since the slit cutting surface 56a on the closure region 56 side overlays the slit cutting surface 52a on the remaining membrane member 52 side from the outside with respect to the radial direction, a resisting force such as a friction resistance between the closure region 56 side and the remaining membrane member 52 side can be reduced. Thus, at an onset of the diffusion operation when the air supply to the diffuser tube is started, the diffusion slits 54 are easily open up and thus reduce the pressure loss during the diffusion operation.

It should be noted that the diffuser tube 51 can be used not only in an aeration tank for sewage treatment facilities, but also in an aeration tank for processing waste water from a variety of industries and water purification as well. In addition, the diffuser tube 51 can also be installed under an immersion-type membrane separation device and used to clean a surface of the membrane, and a scope of the application of the diffuser tube 51 is not limited by specific examples.

What is claimed is:

1. A diffuser tube, comprising:
   a membrane member formed of a tubular elastic body having an inner surface which is in communication with an air supply source; and
   a plurality of diffusion slits formed on and penetrating through the membrane member, each of the plurality of diffusion slits having a non-straight line shape on a surface of the membrane member, the non-straight line shape having two ends and a line segment defined therebetween, the diffusion silt and the line segment defining a closure region functioning as a pseudo-lid formed in the membrane member, each of the plurality of diffusion slits having a first slit cutting surface on a closure region side of the membrane member and a second slit cutting surface on a remaining portion side of the membrane member,
   wherein each of the plurality of diffusion slits has a slanted surface portion formed in at least a predetermined portion thereof, the first and second slit cutting surfaces of the diffusion slit in the slanted surface portion being slanted with respect to a radial direction of the tubular elastic body, and wherein, in the slanted surface portion, the first slit cutting surface overlays the second slit cutting surface from without.

2. The diffuser tube of claim 1, wherein the diffusion slits are formed in one of an arc shape, a chevron shape, or a bracket shape.

3. The diffuser tube of claim 1, further comprising:
   a support member formed as a tubular body configured to hold an inner surface of the membrane member, the support member having a plurality of openings penetrating through a wall of the tubular body, the openings being provided so as not to overlap the plurality of diffusion slits.

4. The diffuser tube of claim 2, further comprising:
   a support member formed as a tubular body configured to hold an inner surface of the membrane member, the support member having a plurality of openings penetrating through a wall of the tubular body, the openings being provided so as not to overlap the plurality of diffusion slits.

5. The diffuser tube of claim 1, wherein the closure region is capable of deforming independently of the elastic tubular body.

* * * * *